United States Patent [19]
Walsh

[11] Patent Number: 4,816,714
[45] Date of Patent: Mar. 28, 1989

[54] CORNER CUBE ARRAY FOR USE IN INCANDESCENT LAMPS

[75] Inventor: Peter J. Walsh, Sterling, N.J.

[73] Assignee: Duro-Test Corporation, North Bergen, N.J.

[21] Appl. No.: 102,396

[22] Filed: Sep. 29, 1987

[51] Int. Cl.⁴ .......................... H01K 1/26; H01K 1/32
[52] U.S. Cl. .................................... 313/111; 313/112; 313/114
[58] Field of Search ................ 313/111, 112, 113, 114

[56] References Cited

U.S. PATENT DOCUMENTS

| | | | |
|---|---|---|---|
| 4,275,327 | 6/1981 | Walsh | 313/111 |
| 4,612,473 | 9/1986 | Nilssen | 313/111 |

Primary Examiner—Palmer C. DeMeo
Attorney, Agent, or Firm—Darby & Darby

[57] ABSTRACT

A surface for reflecting light energy of a first frequency range while transmitting light energy of a second frequency range and an incandescent lamp employing such a surface utilizes an array of corner cube elements. Each element has three sides which are mutually perpendicular and meet at a common vertex. Each side of each element is a surface in the shape of a square. All edges of the three square sides have equal dimensions. The array of elements is arranged with each element except for extreme outer elements having all of its edges contiguous with corresponding edges of other elements so as to form a continuous surface of the elements such that the projection of outer edges of each element on a common plane through corners of each side diagonally opposite to the vertex of that element form a hexagon. At least one surface of each element being dichroic to allow transmission of light energy of the second frequency range while reflecting light energy of the first frequency range.

14 Claims, 3 Drawing Sheets $\alpha = 35.26°$

CORNER CUBE ARRAY FOR USE IN INCANDESCENT LAMPS

BACKGROUND OF THE PRESENT INVENTION

A. Field of the Present Invention

The present invention relates to energy efficient, reflecting/transmitting corner cube arrays and, in particular, to incandescent lamps of the energy saving type wherein infrared energy is returned to the filament by such an array, allowing visible light to escape the envelope of the lamp.

B. Description of the Prior Art

Several attempts have been made to create an incandescent lamp which returns (reflects) a substantial portion of the infrared energy emitted by the filament back to the filament itself. This is accomplished by using the envelope of the lamp as a surface which will transmit visible light effectively unimpeded but which will substantially reflect infrared energy back to the filament.

In one such commercial construction, Duro-Test Corporation employs a lamp envelope which is coated with a metal film having a trademark Vistir. This energy saving lamp operates in the manner described above, i.e., it transmits visible light energy and reflects infrared energy back to the filament so that less energy is used in total to light the lamp than an ordinary incandescent lamp.

One difficulty with the Vistir-coated Duro-Test lamp is the requirement that the envelope be precisely shaped so that the infrared energy will reasonably accurately be returned to the filament.

It has been known to use corner cube reflecting surfaces in various applications to redirect light back in the direction of its source. It has also been proposed, such as has been disclosed in U.S. Pat. No. 4,612,473 to Nillsen, to use a plurality of dichroically structured corner cube reflectors to transmit visible light while reflecting infrared energy to the filament of an incandescent lamp. While Nillsen's proposal removes the requirement that the lamp envelope need be made accurately, his disclosure is limited to construction of a dichroic surface where his corner cubes are arranged in a triangular way (see his FIG. 2) which does not provide reflective surfaces designed for efficient infrared reflection. Nillsen's triangular method of joining the corner cubes will result in 50% of the rays incident on the corner cube missing the third corner so that they will not return to the filament of the lamp.

SUMMARY OF THE PRESENT INVENTION

It is accordingly an object of the present invention to provide an improved construction of an energy saving incandescent lamp.

It is another object of the present invention to provide a construction of an energy saving incandescent lamp using a plurality of reflectors of a specially designed geometric shape.

It is a further object of the present invention to provide a construction of an energy saving incandescent lamp employing a plurality of corner cube reflectors for infrared energy arranged in a manner to return a high percentage of incident radiation to its source.

It is a still further object of the present invention to provide an incandescent energy savings lamp having a plurality of corner cube reflector/transmitter surfaces arranged with hexagonally interfaces and of an optimally selected size.

It is another object of the present invention to provide an incandescent energy savings lamp having a plurality of corner cube reflector/transmitter surfaces wherein the surfaces are coated for large reflection of infrared energy using preselected coating materials.

In accordance with the present invention, a surface for reflecting light energy of a first frequency range while transmitting light energy of a second frequency range comprises an array of corner cube elements. Each element has three sides which are mutually perpendicular and meet at a common vertex. Each side of each element is a surface in the shape of a square. All edges of the three square sides have equal dimenions. The array of elements is arranged with each element except for extreme outer elements having all of its edges contiguous with corresponding edges of other elements so as to form a continuous surface of such elements. The projection of outer edges of each element on a common plane through corners of each side diagonally opposite of the vertex of that element form a hexagon. At least one surface of each element is dichroic to allow transmission of light energy of the second frequency range while reflecting light energy of the first frequency range.

Further in accordance with the present invention, an energy saving incandescent lamp comprises a filament for emitting radiant energy of a first frequency range and a second frequency range and an envelope surrounding the filament including a surface for reflecting light energy of the first frequency range while transmitting light energy of a second frequency range having an array of corner cube elements. Each element has sides which are mutually perpendicular and meet at a common vertex. Each side of each element is a surface in the shape of a square. All edges of the three square sides have equal dimenions. The array of elements is arranged with each element, except for extreme outer elements, having all of its edges contiguous with corresponding edges of other elements so as to form a continuous surface of the three elements such that the projection of outer edges of each element on a common plane through corners of each side diagonally opposite to the vertex of that element form a hexagon. At least one surface of each element is dichroic to allow transmission of light energy of the second frequency range while reflecting light energy of the first frequency range.

For a better understanding of the present invention, reference is made to the following description and accompanying drawings, while the scope of the present invention will be pointed out in the appended claims.

BRIEF DESCRIPTION OF THE DRAWINGS

In the drawings:

FIG. 3a is a view taken along YY' of FIG. 2;

FIG. 5b is a veiw along vector $\hat{M}_2$ of FIG. 5a;

FIG. 8a and 8b are cross-sectional views of a corner cube surface which is to be coated in accordance with the invention.

DESCRIPTION OF THE PREFERRED EMBODIMENTS

Figure 1:
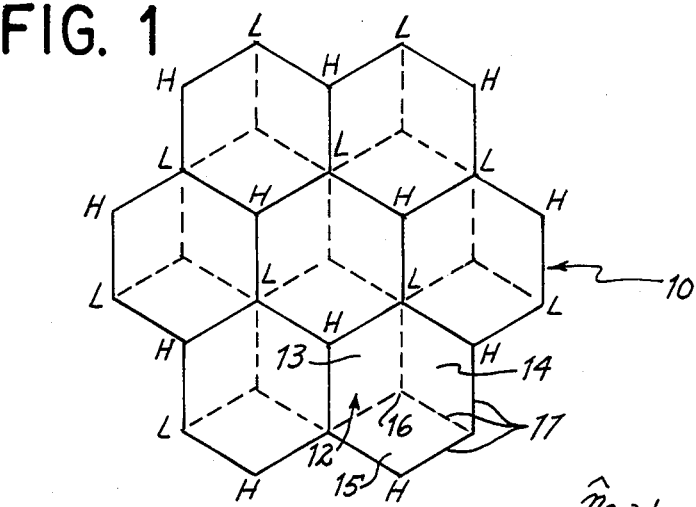
FIG. 1 illustrates a preferred arrangement of corner cube surfaces in accordance with the invention.

Referring initially to FIG. 1, shown there is a surface 10 of corner cube reflectors constructed in the preferred manner of the present invention. The representation shown in FIG. 1 is a two-dimensional projection of the three-dimensional array of corner cube reflectors. Each corner cube reflector or array element, e.g., element 12, consists of three sides, 13, 14 and 15. Each side is in the shape of a square with the edges 11 of all squares being equal. The three square sides meet at a common vertex 16.

The edges of each element are contiguous with respective edges of other elements (except for outer elements) so as to form a continuous surface. In FIG. 1, vertices marked H are high points in a three-dimensional sense while vertices marked L are low points.

In a preferred arrangement, at least one surface of each array is coated with a dichroic coating. This permits light energy of a first frequency range to pass through the dichroic-coated surface while light energy of a second frequency range will be reflected. In FIG. 1, element 12 has side 15 so coated. A preferred dichroic coating is a metal-dielectric film employed by Duro-Test Corporation, bearing a trademark Vistir. Such film is composed of three alternating layers composed of dielectric-metal-dielectric. A nominal composition is $TiO_2$-silver-$TiO_2$ in thicknesses of approximately 30-20-30 nanometers, respectively.

All elements will have the same respective surface dichroically coated.

While all three surfaces of each element may be dichroically coated, in a preferred arrangement, two sides of each element are coated with a coating which is totally reflective to the first and second frequency ranges. In FIG. 1, sides 12 and 14 are preferably silver coated so as to be totally reflective to light energy. Respective surfaces of the other elements are similarly coated.

Applicant has discovered that an array of corner cube reflectors having a hexagonal projection of elements is far more energy efficient (in terms of energy being reflected back to its source) than conventional corner cube reflectors having non-vertex contacting edges lying in a single plane and wherein the sides of each element are triangular. The following analysis will provide theoretical justification for applicant's invention.

Figure 2A:
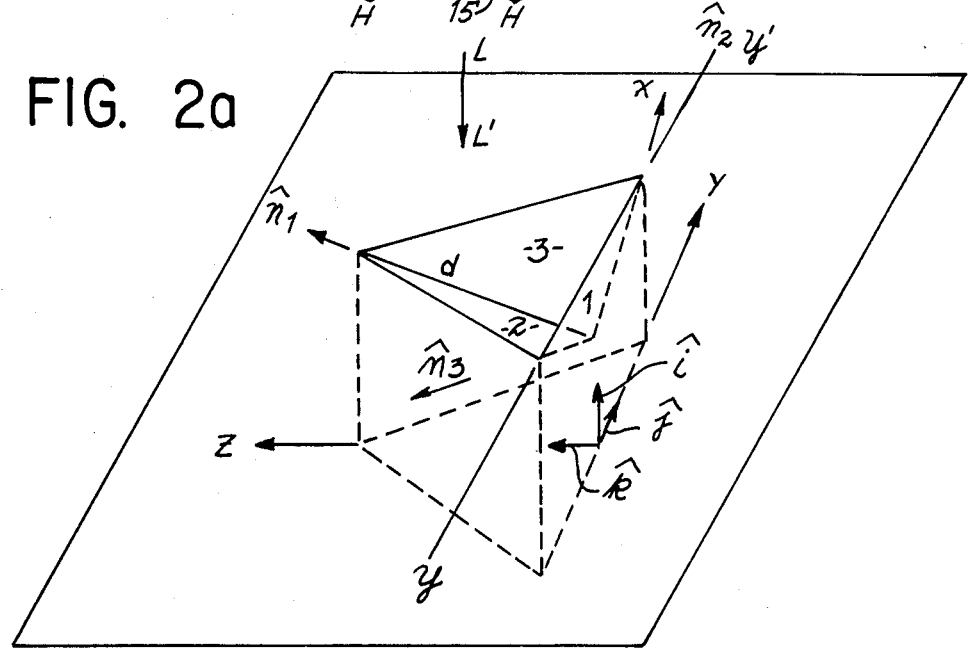
FIGS. 2a, 2b, 2c and 2d illustrate the geometric aspects of a corner cube which is oriented so that all three incident angles are the same.

Referring to FIG. 2a, a corner cube reflector of conventional design is shown wherein the corner cube is constructed by slicing the corner of a cube so that the three corner cube edges have the same dimension d. FIGS. 2a, 2b, 2c and 2d indicate the geometry of the reflected rays of such a cube, while FIGS. 3a and 3b indicate the geometry of the diffracted rays. The corner cube is oriented so that all three incident angles on the three faces of the corner cube are the same regardless of order of striking the faces. The condition of the same incident angle, regardless of order, is absolutely necessary since the filament rays (in connection with the lamp construction to be discussed further below) will randomly strike the corner cube faces and the Vistir film can be designed for one incident angle only. The preferred orientation of the corner cube produces an incident angle to each surface for both direct filament rays and reflected rays of 54.73°.

Referring to FIG. 2a, the following notation and relationships apply:

$\wedge$ = indicates unit vector;

$\hat{1}, \hat{2}, \hat{3}$ = unit normals to surfaces 1, 2, 3;

surfaces 1, 2, 3 are perpendicular to each other; the light ray makes the same angle with each surface normal; LL' is along , the unit vector along x axis; and $\hat{k}$ are unit vectors along y and z axis, respectively.

$$\hat{i} \cdot \hat{m}_1 = \hat{i} \cdot \hat{m}_2 = \hat{i} \cdot \hat{m}_3$$

$$\hat{m}_1 \cdot \hat{m}_2 = \hat{m}_1 \cdot \hat{m}_3 = \hat{m}_2 \cdot \hat{m}_3 = 0$$

$$\hat{m}_1 \cdot \hat{m}_1 = \hat{m}_2 \cdot \hat{m}_2 = \hat{m}_3 \cdot \hat{m}_3 = 1$$

$$\hat{m}_1 = \frac{\hat{i}}{\sqrt{3}} + o\hat{j} + \sqrt{\frac{2}{3}} \hat{k}$$

$$\hat{m}_2 = \frac{\hat{i}}{\sqrt{3}} + \frac{\hat{j}}{\sqrt{2}} - \sqrt{\frac{1}{6}} \hat{k}$$

$$\hat{m}_3 = \frac{\hat{i}}{\sqrt{3}} - \frac{\hat{j}}{\sqrt{2}} - \sqrt{\frac{1}{6}} \hat{k}$$

Figure 2B:
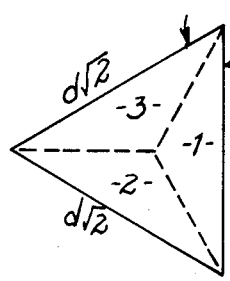
Figure 2C:
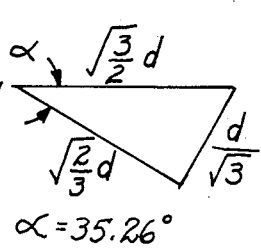
Figure 2D:
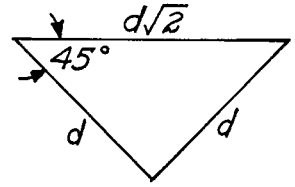

FIG. 2b illustrates a view along light ray, L';
FIG. 2c illustrates a view along upper surface YY';
FIG. 2d illustrates a view along any normal, $\hat{M}$ The angle between the light ray and each surface normal:

$$\cos \theta_i = \hat{i} \cdot \hat{m} = \frac{1}{\sqrt{3}}, \theta_i = 54.74°$$

Figure 3A:
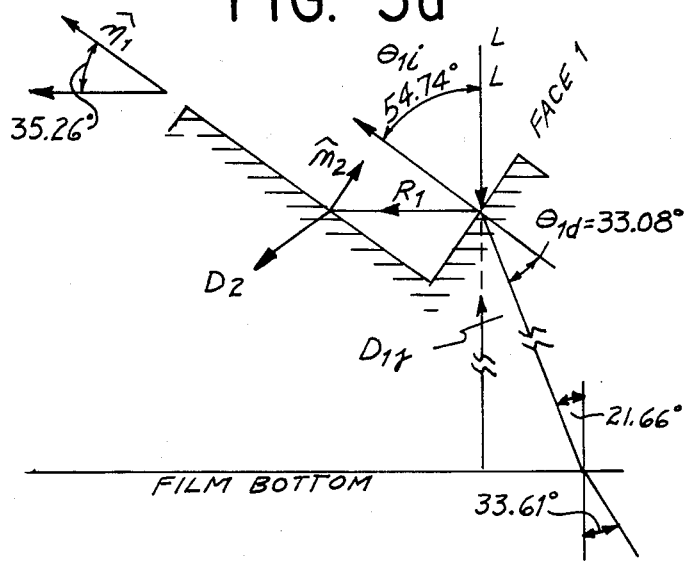
FIGS. 3a and 3b are explanatory geometric diagrams of diffracted rays of the corner cube of FIG. 2 where

FIG. 3a is a view along YY' of FIG. 2a. The applicable relationships are:

$$\hat{m}_1 \cdot \hat{k} = \cos \theta_{si} = \sqrt{\frac{2}{3}}$$

$$\theta_{si} = 35.26°$$

$$\theta_{id} = 33.08$$

$$\sin \theta_{tlR} = \frac{1}{m} \quad \text{index } \mu = 1.5$$

$$\theta_{tlR} = 41.8°$$

$$\theta_{1b} < \theta_{tlR}$$

$$v = i - 2m(i \cdot m_1)$$

$$v_1 \cdot m_2 = i \cdot m_1$$

-continued $$\therefore \theta_{1i} = \theta_{2i}$$

The first diffracted ray is not totally internally reflected. The emerging ray from the bottom is at 33.61° from the x axis or LL' in FIG. 3a.

Figure 3B:
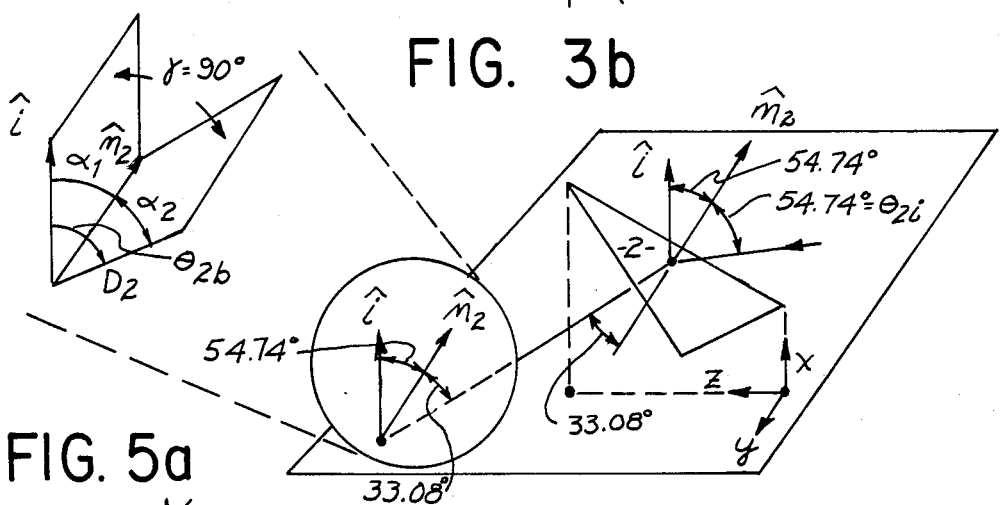

In FIG. 3b,
$D_1$ is at 33.08° from $\hat{M}_2$;
$\hat{M}_2$ is at 55.74° from $\hat{i}$;
The plane through $\hat{i} + \hat{M}_2$ is ⊥ plane through $\hat{M}_2$ and $D_2$ since the corner cube planes are perpendicular.
The second diffracted ray is internally reflected.
The view along any line between two parallel planes results in reflections in the preferred orientation appearing as a 90° change in direction.

Figure 4A:
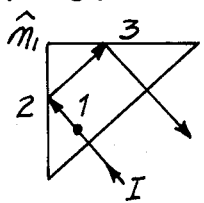
FIGS. 4a, 4b, 4c and 4d illustrate ray reflection of the corner cube surfaces where 4d illustrates the corner cube and 4a, 4b and 4c are views along the vectors $\vec{M}_1$, $\vec{M}_2$ and $\vec{M}_3$ of FIG. 4a, respectively.
Figure 4B:
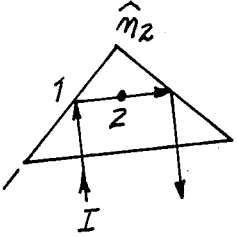
Figure 4C:
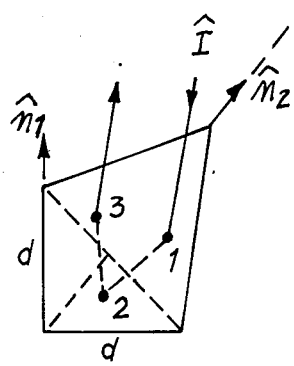
Figure 4D:
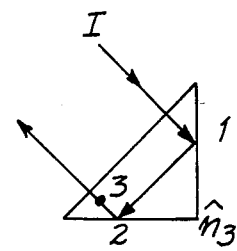

FIGS. 4a, 4b and 4c are views along $\hat{M}_1$, $\hat{M}_2$ and $\hat{M}_3$, respectively. FIG. 4d is the corner cube in its entirety.

Figure 5A:
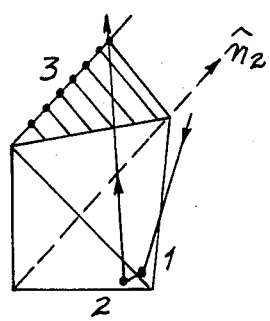
FIGS. 5a and 5b illustrate a preferred arrangement of the cube surfaces to prevent ray loss where
Figure 5B:
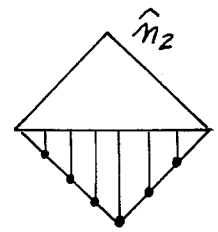

If the ray is incident at the extremity along $\hat{M}_3$, say, the reflection must be at the same distance on plane 3. In the conventional cube, there is no plane there unless the shape were to be altered—see FIG. 5a. The added edge appears as a single line when viewed along $\hat{M}_2$ —see FIG. 5b.

Figure 6:
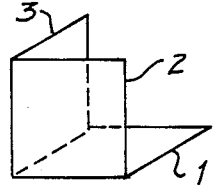
FIG. 6 illustrates the resultant preferred arrangement of a single corner cube.
Figure 7:
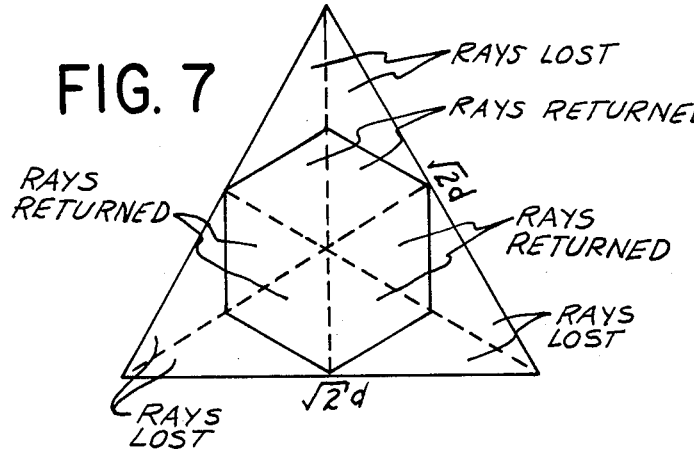
FIG. 7 illustrates the portions of a triangular corner cube which are lost in contrast to the hexagonal arrangement.

When the same approach is performed for the other faces, the result is shown in FIG. 6 (3 of 6 faces of a cube). FIG. 7 illustrates in diagrammatic form the portion of the conventional triangular corner disclosed by Nillsen which will lose incident rays. In contrast, the hexagonal portion results in all rays being returned.

The comparison, $$\text{Triangle area} = A_T = \frac{1}{2} \times \sqrt{2}\, d \times \sqrt{\frac{3}{2}}\, d = \frac{\sqrt{3}}{2} d^2$$

$$\text{Hexagon area} = A_H = 6 \times \left( \frac{1}{2} \times \frac{d}{\sqrt{6}} \times \frac{d}{2\sqrt{2}} \right) = \frac{\sqrt{3}}{4} d^2$$

$$\frac{A_H}{A_T} = 0.5$$

Thus, only 50% of the rays are returned for the triangular shaped corner cube as disclosed by Nillsen.

It should be noted that the visible rays which might pass through the Vistir film are treated above with respect to FIGS. 3a and 3b where a substrate index of 1.5 is assumed. If the three faces of the corner cube were Vistir coated, the first transmitted ray has a diffraction angle of 33.08° and enters the bottom of the film at 21.66°. However, the ray transmitted into the substrate after one reflection enters the film bottom at 61.07° and suffers total internal reflection. This is one reason why Vistir coating on all three corner cube faces is undesirable.

The major reason, however, why the one surface Vistir coated, two surfaces silver coated corner cube is preferred to the three Vistir design is that a lamp constructed with three Vistir coats provides an energy savings of 34.6% while the preferred design (one Vistir coat, two silver coats) will result in an energy saving of 47.7% assuming that a perfectly precise, Vistir coated spherical envelope will yield an energy savings of 50.0%.

More specifically, the infrared watts in a Vistir coated lamp are given by $$Wir = Wo(1-Re)/(1-(1-e)Re). \quad (1)$$

where Wo is the clear watts measured in an uncoated envelope, e is the average emissivity of the filament and the effective fraction of radiation emitted by the filament which returns to the filament is $Re = Ro*Rc$. Here, Ro is the fraction of reflected radiation which returns to the filament and $R_c$ is the fraction of radiation from the filament incident on the coated envelope which reflects from the coated envelope. In a 50% energy savings lamp with 1275 Lumens, Ro=0.88, $R_c$=0.92, e=0.51, Wo=83 watts (the gas loss is taken as 7 watts and the clear visible and uv watts add to 10 watts for a nominal 1500 lumen clear lamp operating at 100 watts), then Wir is 26.3 watts. Because of the reduced visible output, the visible and uv watts fall to 9.2 watts. Using Eq(1) and Re=0.778 =(0.92)³ corresponding to a Vistir Tat on all three faces of a corner cube envelope whose return efficiency is the same as the spherical lamp, the IR watts are Wir=39.4 watts. If the visible output is unchanged, the energy savings now drops to 34.6% in the corner cube lamp with all faces coated from the value at 50% in the comparison TAT coated spherical lamp of similar return efficiency.

There is a substantial reduction of watt savings when three Vistir reflections are needed for a return from the corner cube. A solution to this problem is to coat only one face of the corner cube with Vistir film and coat the other two faces with a highly reflecting film, preferably silver. The effective reflectivity from the corner cube is now Rcc=(Rag) squared*Rf. A reasonable value for the average IR reflectivity of silver is 0.99 and thus Rcc=0.90 if only one face is Vistir coated and two faces are silvered. The IR power is 28.3 watts and the energy savings becomes 47.7%.

Figure 8B:
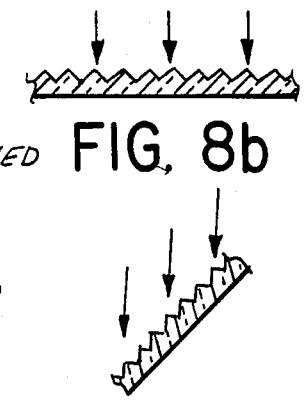

One method of coating the corner cube with silver on two surfaces and one surface with Vistir is shown with respect to FIGS. 8a and 8b. In FIG. 8a, a complete Vistir coat is applied to the entire corner cube area in the direction shown. Then the film is tilted (FIG. 8b) so that only one Vistir face is perpendicular to the direction of silver deposition to silver that respective face in each corner cube. The film is then tilted in a 90° direction to expose a second Vistir coated face to silvering. It is preferred to use a mild etch to remove any stray silver from the Vistir-coated face.

An important feature in the evaluation of a surface of corner cube reflectors disposed on an envelope of a lamp is the return loss. With the use of a corner cube array, the return light heads back to the emission point and not to the image point on the other side of the filament, as it would with a spherical or elliptical envelope. The relevant parameter to describe the corner cube array is $R_c$, the fraction of radiation incident on the array from the filament which returns to the filament. For a linear or curved filament of thickness t, $R_c$ is given approximately by $$1 - \left( 0.76 \frac{\sqrt{\omega l}}{t} \right)$$

where w is the wavelength and l is the envelope radius. A typical filament t is about 1.4 mm, while l is 40 mm and w is near 1.500 micrometers in the near IR. $R_c$ then is 0.88. Optically precise spheres have $R_c$ values near 0.90–0.91. A c-shaped filament of similar thickness to the filament in the example would have a similar value of $R_c$. If the filament thickness were reduced, the value of $R_c$ will reduce accordingly. The optimum diameter of the projected face of a corner cube is about 0.31 mm independent of filament diameter.

The formula for $R_c$ is derived by calculation of the return loss which is the same as the average displacement loss and the diffraction loss. Due to both displacement and diffraction, a portion of each ray returned directly back toward the filament will miss the filament on the return pass. It should be noted that an appreciable portion of the radiation which just misses the filament on the first pass will strike the filament on the second pass.

Figure 9:
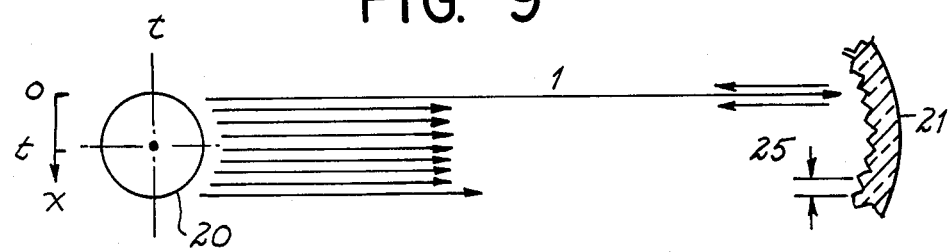
FIG. 9 is a schematic representation of a portion of an incandescent lamp in accordance with the present invention.

Referring to FIG. 9, a portion of an incandescent lamp having a filament 20 of thickness t with an envelope 21 bearing a corner cube array in accordance with the invention is shown. The corner cube array has an inter-peak distance of 2S between elements.

Detailed calculations of the return loss yields the result that $$F \text{ (the return loss)} = 0.76 \left( \frac{\sqrt{\omega l}}{t} \right) = 1 - R_c$$

$$S = 1.27 \sqrt{\omega l}$$

from which the optimum size can be determined for a particular wavelength and filament thickness.

While the foregoing description and drawings represent the preferred embodiments of the present invention, it will be obvious to those skilled in the art that various changes and modifications may be made therein without departing from the true spirit and scope of the present.

What is claimed is:

1. A surface for reflecting light energy of a first frequency range while transmitting light energy of a second frequency range, comprising:
    an array of corner cube elements, each element having three sides which are mutually perpendicular and meet at a common vertex, each side of each element being a surface in the shape of a square, all edges of the three square sides having equal dimensions;
    said array of elements being arranged with each element except for extreme outer elements having all of its edges contiguous with corresponding edges of other elements so as to form a continuous surface of said elements such that the projection of outer edges of each element on a common plane through corners of each side diagonally opposite to the vertex of that element form a hexagon; and
    at least one surface of each element being dichroic to allow transmission of light energy of said second frequency range while reflecting light energy of said first frequency range.

2. The surface of claim 1, wherein said dichroic surface is coated with three discrete film layers, said layers being $T_iO_2$, Ag and $T_iO_2$ in that order having thickness of 30-20-30 nanometers respectively.

3. The surface of claim 1, wherein two surfaces of each element are totally reflective to light energy of said first frequency range, said third surface of each element being dichroic to light energy of said first and second frequency range.

4. The surface of claim 3, wherein said two reflective surfaces and said dichroic surface are corresponding in each corner cube element.

5. The surface of claim 4, wherein the two reflective surfaces are silver coated and the dichroic surface is coated with three discrete film layers, said layers bing $T_iO_2$, Ag and $T_iO_2$ in that order having thickness of 30-20-30 nanometers respectively.

6. The surface of claim 1, wherein the vertices of said elements lie in a common plane.

7. The surface of claim 1, wherein the sides of each element form an equal angle with a line between the vertex of each element and a common point external to the array.

8. An energy saving incandescent lamp comprising:
    a filament for emitting radiant energy of a first frequency range and a second frequency range;
    an envelope surrounding said filament including a surface for reflecting light energy of said first frequency range while transmitting light energy of a second frequency range having an array of corner cube elements, each element having sides which are mutually perpendicular and meet at a common vertex, each side of each element being a surface in the shape of a square, all edges of the three square sides having equal dimensions;
    said array of elements being arranged with each elements, except for extreme outer elements, having all of its edges contiguous with corresponding edges of other elements so as to form a continuous surface of said elements such that the projection of outer edges of each element on a common plane through corners of each side diagonally opposite to the vertex of that element form a hexagon; and
    at least one surface of each element being dichroic to allow transmission of light energy of said second frequency range while reflecting light energy of said first frequency range.

9. The lamp of claim 8, wherein said at least one dichroic surface of each element is coated with three discrete film layers, said layers being $T_iO_2$, Ag and $T_iO_2$ in that order having thicknesses of 30-20-30 nanometers respectively.

10. The lamp of claim 8, wherein two surfaces of each element are totally reflective to light energy of said first and second frequency range.

11. The lamp of claim 8, wherein the two reflective surfaces and said dichroic surface are corresponding in each corner cube element.

12. The lamp of claim 11, wherein the two reflective surfaces are silver coated and the dichroic surface is coated with three discrete film layers, said layers being $T_iO_2$, Ag and $T_iO_2$ in that order having thicknesses of 30-20-30 nanometers respectively.

13. The lamp of claim 8, wherein the sides of each element form an equal angle with a line between the vertex of each element and a common point located at the center of the filament.

14. The lamp of claim 8, wherein said array-bearing surface is disposed concentrically with respect to the filament.

* * * * *